United States Patent [19]

Tribbey et al.

[11] Patent Number: 5,077,514
[45] Date of Patent: Dec. 31, 1991

[54] BATTERY CHARGING APPARATUS AND METHOD

[75] Inventors: David A. Tribbey, Boynton Beach; Gregory P. Watts, Sunrise; Philip G. Kaminski, West Palm Beach; Robert L. Vasquez, Boca Raton, all of Fla.

[73] Assignee: Motorola, Inc., Schaumburg, Ill.

[21] Appl. No.: 589,248

[22] Filed: Sep. 28, 1990

[51] Int. Cl.⁵ .................. H01M 2/10; H01M 10/46
[52] U.S. Cl. ............................................. 320/15; 320/2
[58] Field of Search ....................................... 320/2, 15

[56] References Cited

U.S. PATENT DOCUMENTS

| | | | |
|---|---|---|---|
| 3,344,334 | 9/1967 | Rubin | 320/2 |
| 4,450,400 | 5/1984 | Gwyn | 320/2 |
| 4,527,110 | 7/1985 | McCarty et al. | 320/2 |
| 4,612,491 | 9/1986 | McCarty et al. | 320/2 |
| 4,983,903 | 1/1991 | Bae et al. | 320/2 |

FOREIGN PATENT DOCUMENTS 0081874 5/1984 Japan .................................... 320/2

OTHER PUBLICATIONS

Mid-West Feeder Inc. advertisement, "Vibratory Parts Feeding Systems", 1990.
Somark International Inc. brochure, "MP Series Hot Markers", 1990.

Primary Examiner—Steven L. Stephan
Assistant Examiner—Thomas M. Dougherty
Attorney, Agent, or Firm—Daniel R. Collopy; Vincent B. Ingrassia; William E. Koch

[57] ABSTRACT

An apparatus (112) for charging a plurality of batteries, having at least one aperture (300) capable of receiving a plurality of batteries therethrough, and including at least two slots ($110_I$ and $110_{I+1}$) for accommodating the plurality of batteries therein during a charging process. The apparatus (112) charges the plurality of batteries, and collectively rotates the slots ($110_I$ and $110_{I+1}$) so as to position a slot ($110_I$) accommodating at least one charged battery with an aperture (400) to facilitate the removal of a charged battery. Optionally, a date coding machine (130) applies a representation of a calendar date to the charged batteries.

17 Claims, 7 Drawing Sheets

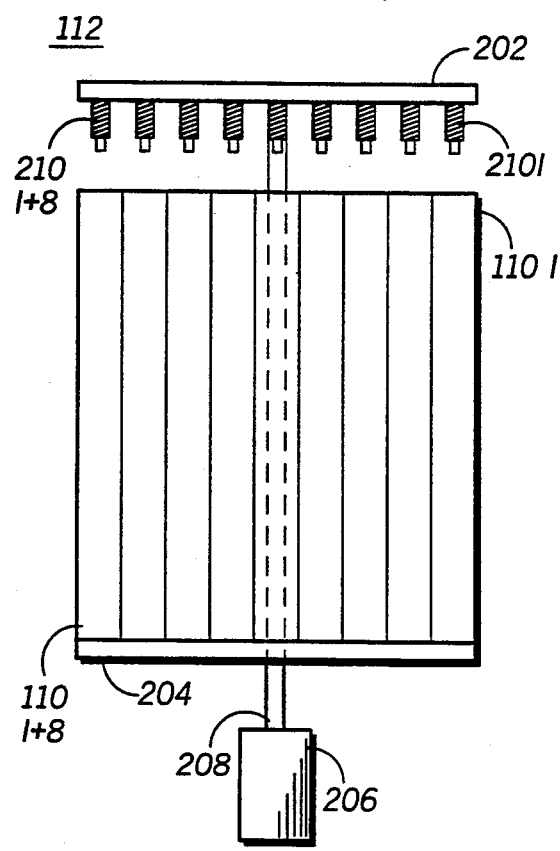
FIG. 2
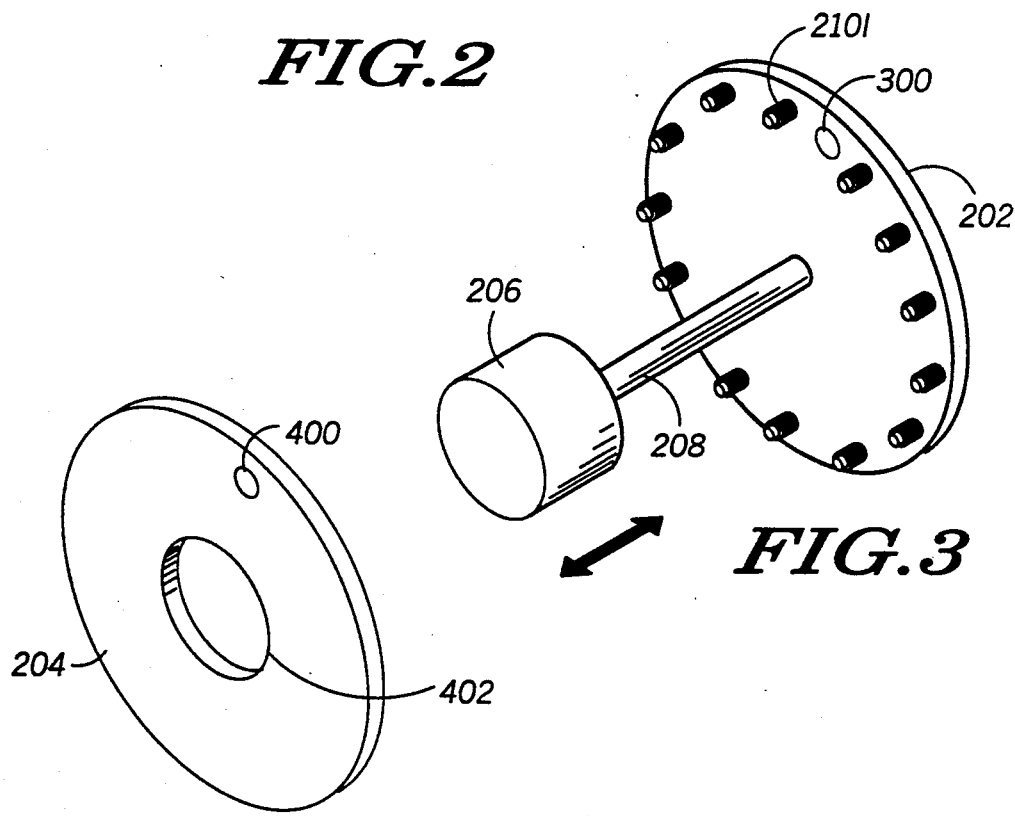
FIG. 3
FIG. 4

5,077,514

BATTERY CHARGING APPARATUS AND METHOD

FIELD OF THE INVENTION

This invention relates in general to the field of battery chargers, and more specifically to those battery chargers capable of selectively charging a plurality of batteries and capable of applying a representation of a calendar date to the plurality of batteries after charging.

BACKGROUND OF THE INVENTION

A conventional battery charger may be constructed and arranged in the form of a rectangular tray having one or more slots capable of accommodating and charging a plurality of batteries (e.g., AA batteries). The batteries are typically oriented to a common polarity and inserted into the slots by hand. After a predetermined charge time interval, the batteries are manually removed and used or optionally deposited into a holding bin.

In a manufacturing environment, it may be subsequently necessary to apply a representation of a calendar date to each battery, thereby identifying by the date of charge (i.e., essentially conveying the manufacture date for the battery component). The date coding process may require placement of individual batteries into a hot stamping machine, or other date coding mechanism, to apply a representation of a calendar date to the batteries.

Particularly for manufacturing environments that require high volumes of charged batteries (e.g., AA batteries) for use with battery operated products, the aforementioned charging and date coding process may be labor intensive. Moreover, the potential for introducing defects during the battery charging and date coding process may be relatively high. For example, any improperly oriented battery within a charging apparatus may result in the battery being improperly charged. Additionally, battery charge time must be carefully monitored to avoid overcharging the batteries. Finally, the date coding process must be carefully monitored to prevent the application of a date code to a battery that is uncharged; a regrettable common occurrence.

Therefore, it is unfortunate that no known battery charging apparatus is available to substantially perform the battery charging and optional coding functions in a relatively automatic fashion.

SUMMARY OF THE INVENTION

In carrying out one form of this invention, there is provided an apparatus for charging a plurality of batteries, having at least one aperture capable of receiving a plurality of batteries therethrough, and including at least two slots for accommodating the plurality of batteries therein during a charging process. The apparatus charges the plurality of batteries, and collectively rotates the slots so as to position a slot accommodating at least one charged battery with an aperture to facilitate the removal of a charged battery.

BRIEF DESCRIPTION OF THE DRAWINGS

FIG. 2 is a side view of a battery charging housing and lift mechanism, in accordance with an embodiment of the invention.

FIG. 3 is a perspective view of the lift mechanism and top plate of FIG. 2.

FIG. 4 is a perspective view of a bottom plate, in accordance with an embodiment of the invention.

DESCRIPTION OF A PREFERRED EMBODIMENT

Figure 1:
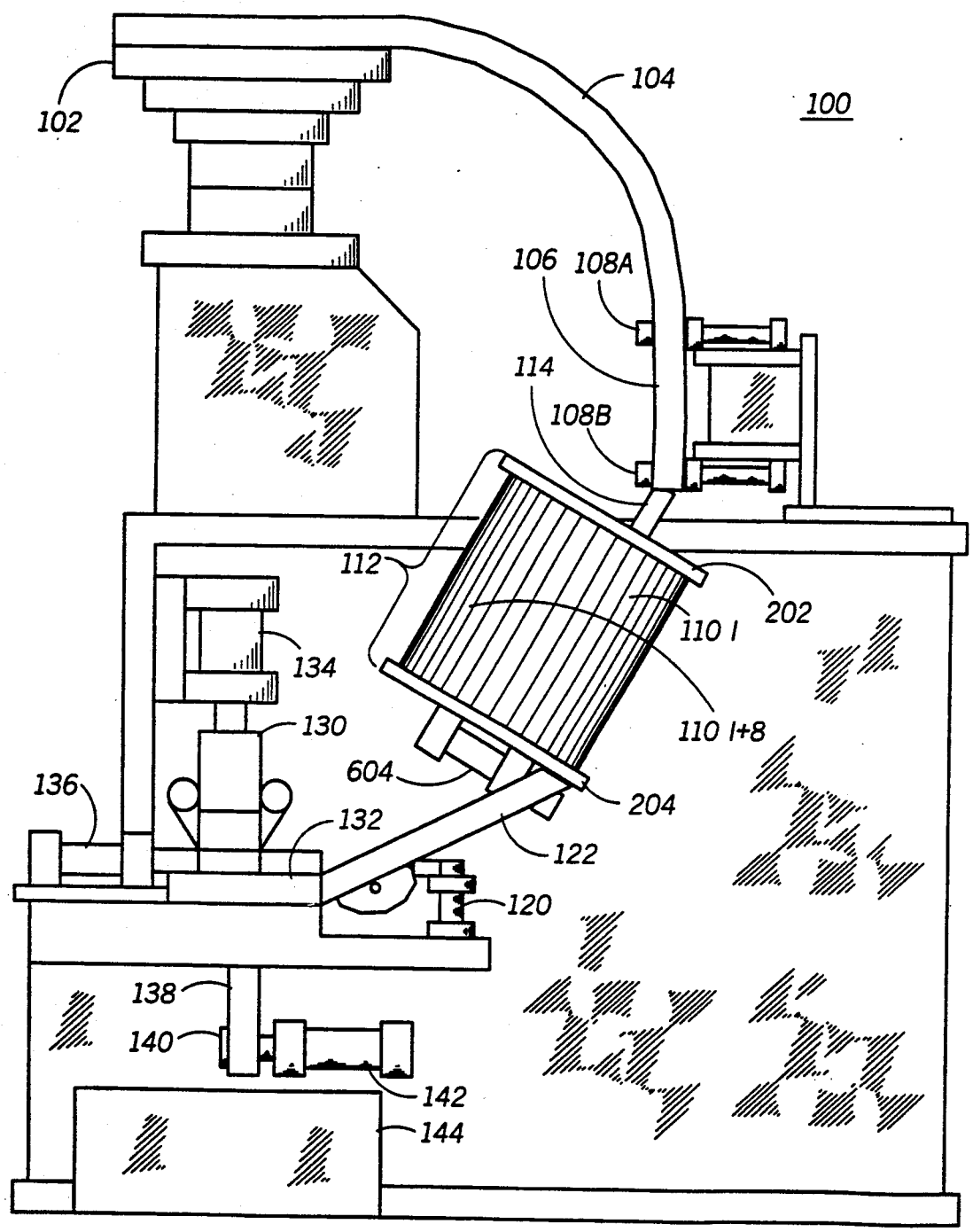
FIG. 1 is a side view of a battery charging apparatus in accordance with an embodiment of the present invention.

Referring to FIG. 1, a side view of a battery charging apparatus 100 is shown in accordance with an embodiment of the present invention. This apparatus 100 is capable of receiving a plurality of uncharged rechargeable batteries (e.g., AA batteries), orienting the batteries to a common polarity, charging the plurality of batteries, and applying a representation of a calendar date to the batteries, as will be more fully discussed below.

The plurality of batteries may be initially deposited in bulk in a conventional vibratory hopper (i.e., vibratory feeder) 102. The vibratory hopper 102 provides a vibrating motion to the batteries, thereby inducing the plurality of batteries to circulate about the inner perimeter of the hopper 102, which comprises a spiralling outward channel (not shown). As the batteries approach an exit point at the top of the hopper 102, an aperture at an inner wall of an output channel 104 is dimensioned to allow misoriented batteries (e.g., those batteries having the positive terminal facing down) to fall through the aperture back into the hopper 102. Therefore, the vibratory hopper 102 is able to orient the batteries to a common polarity. Consequently, the batteries may exit the vibratory hopper 102 at the output channel 104 with all batteries normally oriented with the negative terminal facing down. A vibratory feeding system such as described above is commercially available from Mid-West Feeder, Inc., or California Vibratory Feeders, Inc.

Once oriented within the output channel 104, the batteries are directed to a hopper output queue 106. The output queue 106 preferably comprises two electromechanical control valves (108A and 108B), one at either end. These control valves (108A and 108B) may be powered by a pneumatic mechanism and electrically controlled by a controller module (e.g., a programmable logic controller or PLC, not shown) using techniques known in the art. The input control valve 108A allows a quantity of batteries to fill the hopper output queue 106. The length of the output queue 106 determines the maximum quantity of batteries to be subsequently loaded into a charging slot $110_j$ in a charging module 112. When the controller module determines that another charging slot $110_j$ is empty and in position to receive the batteries, the output control valve 108B allows the queued batteries to drop into the charging slot $110_j$ via a chute 114.

Referring to FIGS. 2, 3, and 4, the charging module 112 is preferably constructed and arranged to accommodate a plurality of charging slots ($110_j$ thru $110_{j+8}$) in a substantially cylindrical shaped housing 112. The charging module and housing 112 preferably comprises a top plate 202 and a bottom plate 204 to provide a charging voltage and/or current to the plurality of batteries contained within the slots ($110_j$ thru $110_{j+8}$), as will be more fully discussed below.

The top plate 202 may be coupled to an air cylinder (i.e., a pneumatic control mechanism) 206, that provides a lifting force to lift the top plate 202 from the slots ($110_j$ thru $110_{j+8}$). The lifting force may be coupled to the top plate 202 via a supporting rod 208. An aperture 402 at the bottom plate 204 may permit the supporting rod 208 to mechanically couple the air cylinder 206 to the top plate 202 with the charger housing 112 assembled. When the air cylinder 206 is activated by the controller module (not shown), the top plate 202 may lift away from the charging slots ($110_j$ thru $110_{j+8}$). The charging slots ($110_j$ thru $110_{j+8}$) may then be rotatively indexed or re-positioned about the housing 112, as will be subsequently more fully discussed.

The charging slots ($110_j$ thru $110_{j+8}$), in this embodiment of the present invention, may be disposed between the top plate 202 and the bottom plate 204, such that a rotational force applied to the slots ($110_j$ thru $110_{j+8}$) may change the position of the slots ($110_j$ thru $110_{j+8}$) relative to an aperture 300 at the top plate 202 and an aperture 400 at the bottom plate 204. In this fashion, the charging module 112 may receive a plurality of batteries within an empty slot $110_j$ (i.e., via the aperture 300 at the top plate 202), rotatively index the slot positions about the cylindrical housing 112, then apply a charging voltage to the plurality of batteries, and subsequently deliver the plurality of charged batteries via the aperture 400 at the bottom plate 204. Therefore, by combining the lifting and lowering of the top plate 202 with the rotative indexing of the slots ($110_j$ thru $110_{j+8}$), the plurality of batteries may be received within the housing 112, a charging voltage and/or current may be applied, and the plurality of charged batteries may be disbursed via the aperture 400 at the bottom plate 204.

To apply the charging voltage and/or current to the plurality of batteries within the slots ($110_j$ thru $110_{j+8}$), the top plate 202 comprises spring loaded electrical contacts ($210_j$ thru $210_{j+8}$, see FIG. 2). Each electrical contact (e.g., $210_j$) corresponds to a slot position (e.g., $110_j$). To charge a plurality of batteries within a slot (e.g., $110_j$), the top plate may be lowered onto the slots ($110_j$ thru $110_{j+8}$) and the corresponding electrical contact (e.g., $210_j$) may be energized with a charging voltage to provide a charge to the plurality of batteries within the slot (e.g., $110_j$). According to the preferred embodiment, the bottom plate 204 comprises an electrically conducting surface (e.g., made of copper) that electrically couples to the negative polarity side of the oriented batteries within the slots ($110_j$ thru $110_{j+8}$), thereby providing an electrical return contact for the charging circuit. The spring loaded electrical contacts ($210_j$ thru $210_{j+8}$), therefore, may electrically couple from a charging voltage source (not shown) to the plurality of batteries within the slots ($110_j$ thru $110_{j+8}$), and the bottom plate conductive surface may provide an electrical return from the batteries to the charging voltage source, thereby completing the charging circuit. Moreover, an optional electrical switch (e.g., a relay switch, not shown) for each electrical contact ($210_j$ thru $210_{j+8}$) may serve to control the distribution of the charging voltage to the slots ($110_j$ thru $110_{j+8}$). Hence, the controller module (not shown) may selective apply the charging voltage and/or current to the slot (e.g., $110_j$) by controlling the electrical switch for the corresponding electrical contact (e.g., $210_j$).

Further, each electrical contact ($210_j$ thru $210_{j+8}$) may preferably receive the charging voltage and/or current via a corresponding conventional constant current source circuit (not shown). The constant current preferably delivers the optimal charge to the batteries without wasting substantial electrical energy in the chemical reaction process within the batteries or in wasted heat energy. Therefore, the charge may preferably be applied to the plurality of batteries within a slot (e.g., $110_j$) using a constant current that may be determined from manufacturer supplied specifications for the rated capacity of the batteries (e.g., 500.0 milliamp hour) and the suggested charge rate (e.g., approximately 166.7 milliamps for three hours).

Optionally, a battery polarity sensor (not shown), that preferably comprises a voltage sensor electrically coupled to the respective electrical contact (e.g., $210_j$) for each slot (e.g., $110_j$), may sense when a plurality of batteries within the slot (e.g., $110_j$) may have at least one battery misoriented, as will be more fully discussed below. Additionally, at least one shorted battery or conversely an open circuit condition (e.g., caused by a contamination of a battery contact) may also be detected by the sensor. Such a sensor may preferably comprise a voltage sensor to sense when the voltage of the plurality of batteries within the slot (e.g., $110_j$) is above a first voltage threshold or below a second voltage threshold. An open circuit condition within the slot (e.g., $110_j$) may be indicated by sensing a slot voltage above the first threshold. At least one battery having a reversed polarity or a short circuit condition within the slot (e.g., $110_j$) may be indicated by sensing a slot voltage below the second threshold. Therefore, the sensed voltage across the plurality of batteries within the slot (e.g., $110_j$) may indicate an exceptional condition that may preclude a full charging cycle from being applied to the batteries within that slot (e.g., $110_j$). Consequently, the controller module may tag and remember the exceptional slot position (e.g., $110_j$) by storing a "bad slot" marker within the controller memory (e.g., by storing a logic "1" within a memory location corresponding to the slot position), and subsequently may divert the batteries from that slot (e.g., $110_j$) to a reject bin, as will be subsequently more fully discussed. Further, by rejecting the "bad slot" (i.e., switching out the charging voltage and/or current) before a full charging cycle is applied to the plurality of batteries within the slot, waste due to catastrophic battery failure may be reduced. A simple misorientation of one battery may be simply corrected with limited damage to the other batteries within the slot. Since a preferred number of batteries per slot may be five, six, or more, the potential cost savings due to this additional battery polarity sensing step may be substantial.

Figure 5:
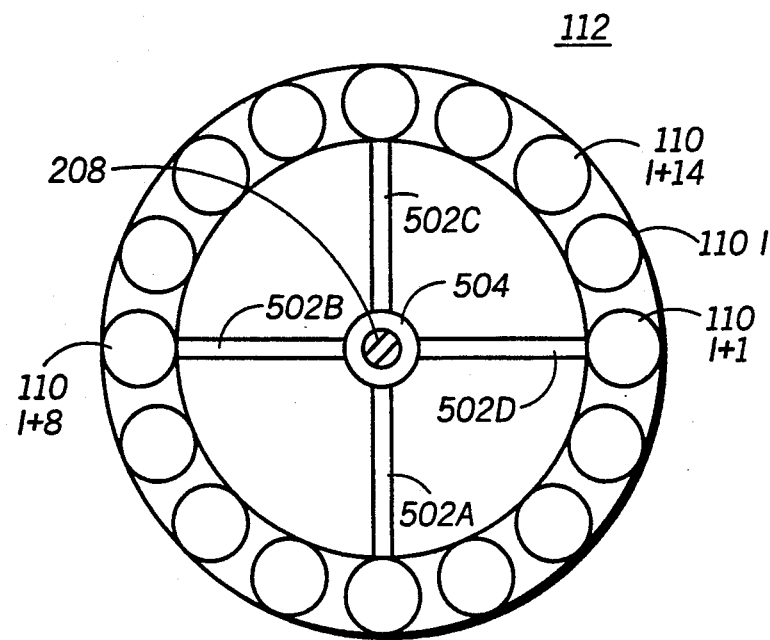
FIG. 5 is a top view of the battery charging housing of FIG. 2 with the top plate removed.
Figure 6:
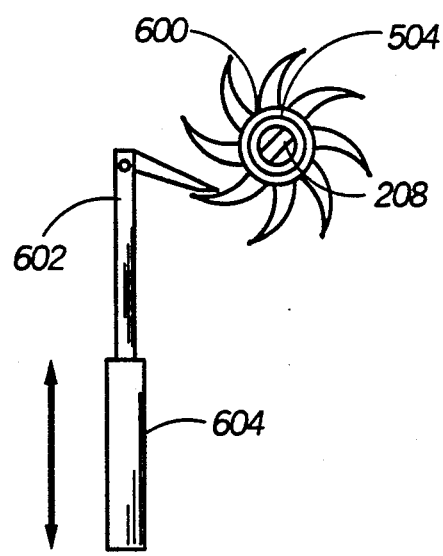
FIG. 6 is a top view of a ratchet and lever mechanism that may be used to provide rotary motion to the battery charging housing of FIG. 5, in accordance with an embodiment of the invention.

Referring to FIGS. 5 and 6, a top view of the battery charging housing 112 with the top plate 202 removed and a ratchet 600 and lever 602 mechanism that may be used to provide rotational motion to the battery charging housing 112 are shown, in accordance with an embodiment of the present invention. The charging slots ($110_I$ to $110_{I+14}$) may preferably be rotatively indexed in a counter-clockwise motion by the ratchet wheel 600 and the reciprocating lever 602 mechanism, all powered by an air cylinder 604 that is controlled by the controller module (not shown).

Alternatively, a conventional stepper motor (not shown) or a conventional cam and lever mechanism (not shown) may be used instead of the ratchet 600 and lever 602 mechanism to provide the rotational motion to the housing 112. One advantage of the stepper motor may be the capability of the controller module to randomly locate the slot positions using either rotational clockwise or counter-clockwise motion, since the ratchet 600 and lever 602 mechanism typically provides unidirectional rotational motion. Moreover, the stepper motor implementation may be capable of quickly diverting a "bad slot" (e.g., $110_j$) of batteries (e.g., misoriented batteries) to a reject bin and subsequently receiving a plurality of batteries from the vibratory hopper 102 into that empty slot (e.g., $110_j$), thereby improving overall throughput for the battery charging process. In the ratchet 600 and lever 602 approach, the "bad slot" of batteries may continue rotatively indexing through the battery charging cycle (i.e., having the charging voltage switched off from that slot) until the "bad slot" of batteries indexes to aperture 400 at the bottom plate 204, therethrough the batteries may be diverted to the reject bin accordingly.

The rotational motion is coupled from the ratchet wheel 600 to the housing 112 via a substantially cylindrical hollow tube 504 coupled to rotating rods (502A thru 502D). The tube 504 is mechanically coupled to and substantially concentric with the ratchet wheel 600. The supporting rod 208 may provide the lifting force to the top plate 202 via an aperture at the ratchet wheel 600 and via the hollow tube 504. In this fashion, the lifting force may be coupled to the top plate 202 and the rotational motion may be independently coupled to the slots ($110_I$ to $110_{I+14}$).

Figure 7:
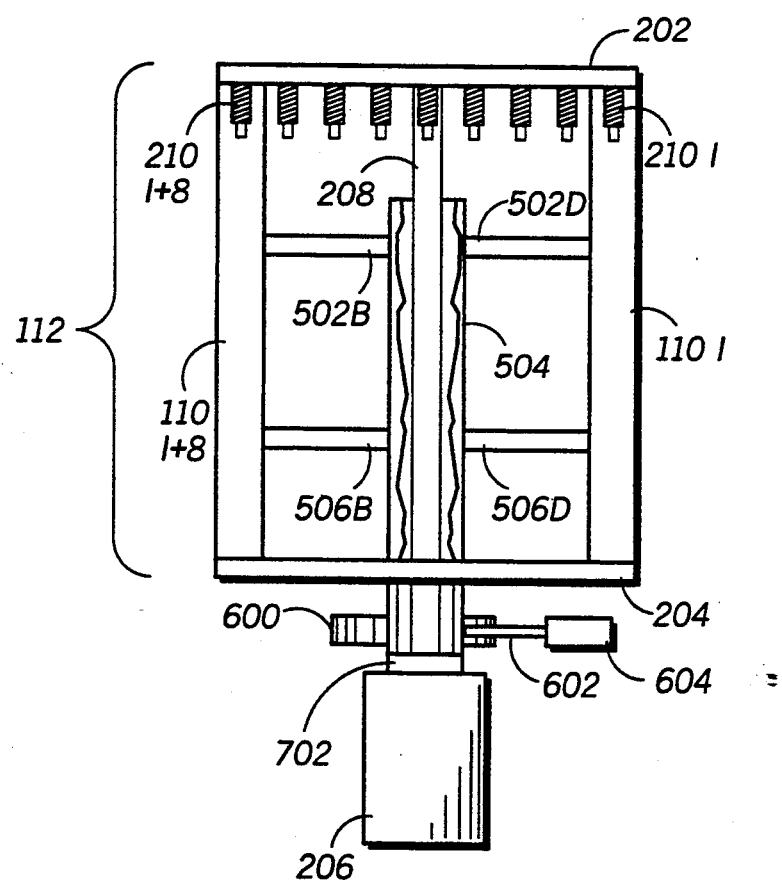
FIG. 7 is a side view of the housing and ratchet mechanism of FIGS. 2, 5, and 6, having a portion of the housing, a portion of a rotating hollow tube, and a portion of the ratchet mechanism removed to provide visibility to the lifting and rotating mechanisms, according to an embodiment of the invention.

Referring to FIG. 7, a side view of the aforementioned housing 112, ratchet 600, and lever 602 construction and arrangement is shown, in accordance with an embodiment of the present invention. A portion of the housing 112, part of the rotating hollow tube 504, and a section of the ratchet mechanism 600 are removed in this illustration, thereby providing substantial visibility to the lifting and rotating mechanisms. Two levels of rotating rods (502B, 502D, 506B, and 506D) couple the rotational motion from the hollow tube 504 to the charging slots ($110_I$ to $110_{I+8}$), and provide structural integrity to the rotating housing 112. Further, a bearing module 702 may provide substantially frictionless support for the rotating tube 504 and housing 112.

The top 202 and bottom 204 plates normally remain in relatively fixed rotational positions, having the slots ($110_I$ to $110_{I+8}$) and housing 112 rotatively indexing slot positions from the aperture 300 in the top plate 202 to the aperture 400 in the bottom plate 204. In this fashion, a slot (e.g., $110_{I+14}$) may receive a plurality of batteries via the aperture 300 in the top plate 202, the slot may then be rotatively indexed to subsequent slot charging positions, and finally the plurality of charged batteries may be delivered at the aperture 400 in the bottom plate 204. The approximate amount of charging time spent at each slot charging position (e.g., $110_I$ to $110_{I+12}$) may be determined by the total specified charging time (e.g., three hours) divided by the number of slot charging positions.

Once a plurality of batteries reaches aperture 400 at the bottom plate 204, the controller module may determine that the batteries have received a full charging cycle with no exceptional conditions indicated (i.e., batteries are properly oriented with no short or open circuit conditions detected). However, a "bad slot" marker in the controller module memory may result in the plurality of batteries being diverted to a reject bin (not shown). To divert the rejected batteries the controller module may control an air cylinder 120 (see FIG. 1) to aim an output chute 122 toward the reject bin. The plurality of batteries from the "bad slot" may exit the charging module 112 and may be received into the reject bin via force of gravity.

Referring again to FIG. 1, a successful charge cycle preferably directs the plurality of batteries from a slot (e.g., $110_j$) to a date stamping machine 130. A date stamping press suitable for use in this application may be available from Somark International, Inc. (e.g., model MP2). The batteries may be received from the chute 122 into a channel 132 within the stamping machine 130. Under control of the controller module the batteries may be individually received into a stamping chamber (not shown), sensed to be properly located, and a representation of a calendar date may be applied to each battery (e.g., a date code may be stamped onto the battery). The controller module may control the coding process (i.e., the stamping of a representation of a calendar date) by activating an air cylinder 134. After being coded, each battery may be directed into an output chute 138 under control of the controller module using an air cylinder 136. Once a plurality of charged and date coded batteries are collected at the output chute 138, an output control valve 140 coupled to an air cylinder 142 may disburse the batteries into a storage bin 144.

Figure 8A:
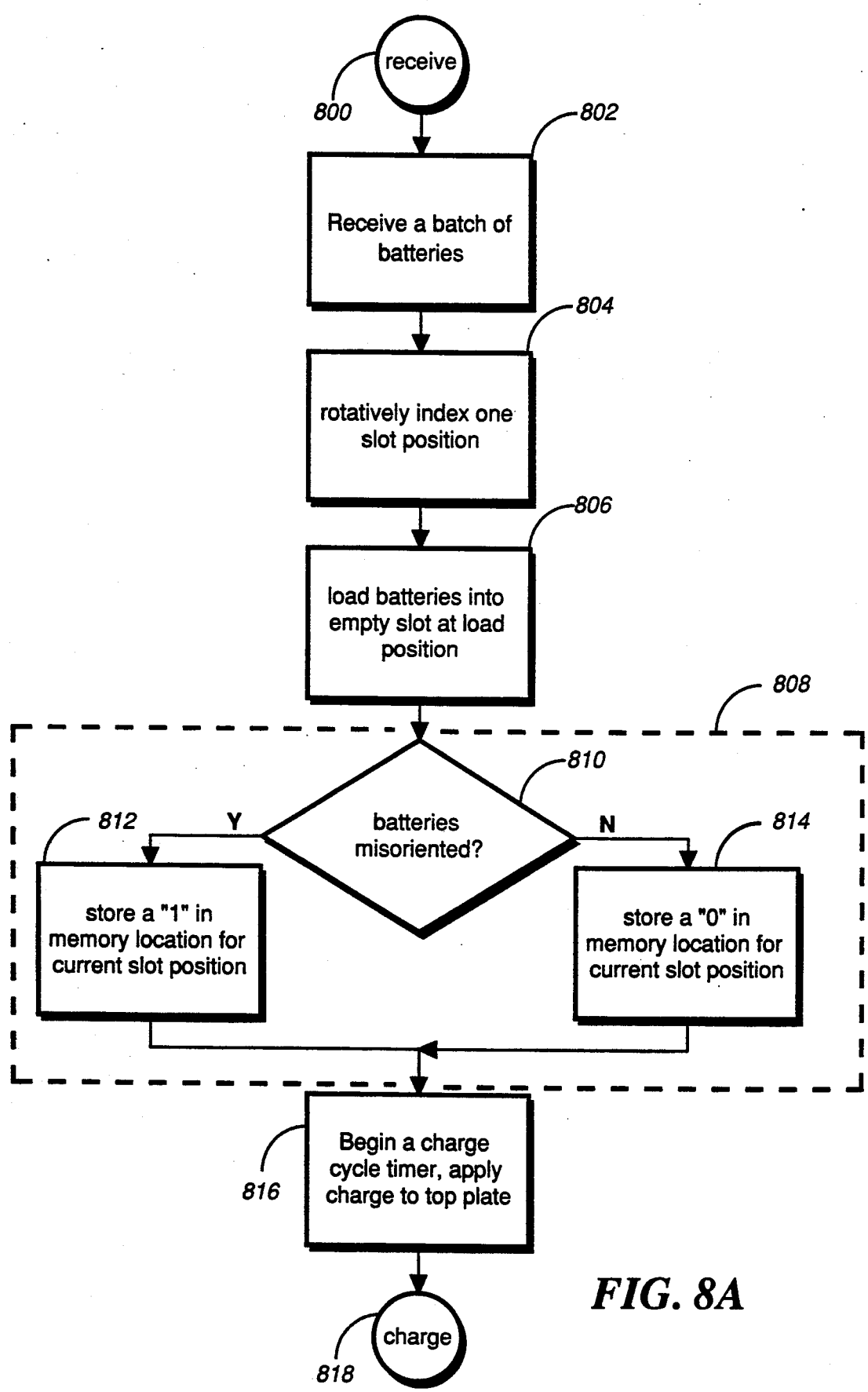
FIGS. 8A and 8B are a flow diagrams of a control sequence for the battery charging apparatus, in accordance with an embodiment of the present invention.
Figure 8B:
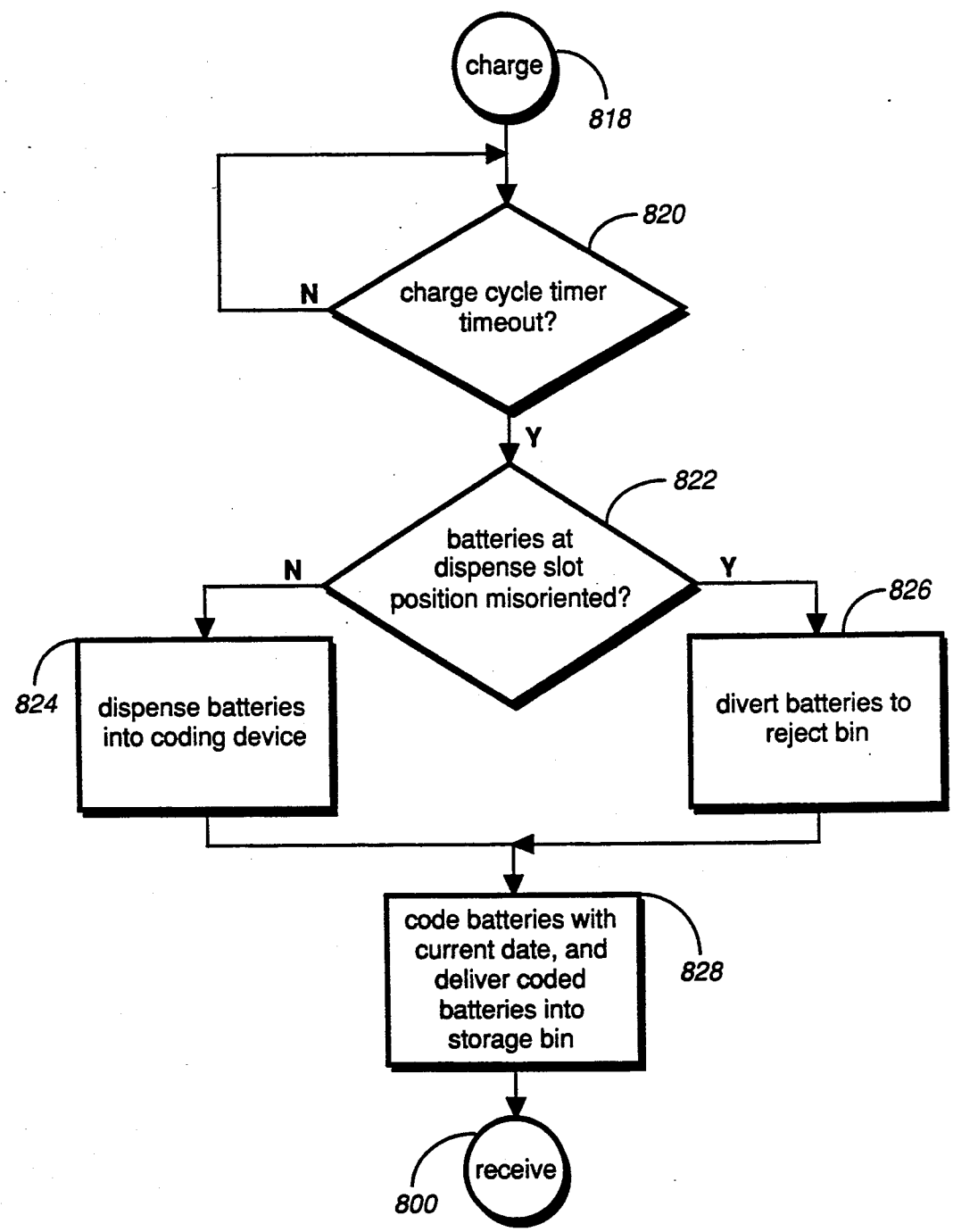

Referring to FIGS. 8A and 8B, a flow diagram of an exemplary control sequence for the battery charging machine 100 is shown, in accordance with an embodiment of the present invention. Once a plurality of batteries is received (step 802) at the output queue 106 (i.e., the charger loading escapement), the charger module 112 is rotatively indexed one slot position (step 804) and the queued batteries are loaded into a charging slot (step 806). The rotative indexing of one slot position may comprise the steps of actuating the air cylinder 206 (see FIG. 2) to lift the top plate 202, actuating the air cylinder 604 (see FIG. 6) to rotate the ratchet wheel 600 one slot position, and then retracting the air cylinder 206 to lower the top plate 202.

The plurality of batteries within the slot may optionally be verified for proper orientation (operation 808). This operation 808 may preferably be repeated at subsequent slot positions (i.e., after providing an incremental charging cycle at each slot position) to positively determine if the batteries within the slot may be misoriented (decision 810). This repetitive testing for an exceptional condition within the slot may be needed subject to the amount of charge the batteries may contain. Initially, the batteries within a slot may be received with minimal charge, therefore possibly indicating an exceptional condition (e.g., a short condition). Hence, by repeating the sensing at subsequent slot positions (i.e., after providing an incremental charge to the batteries) and then making a determination based on a predetermined number of detections of misorientation, the sensing operation 808 may be capable of positively identifying the condition of the batteries within the slot. Further, a misoriented battery or detection of some other exceptional condition (e.g., open circuit or short circuit condition) may result in the controller module storing a "bad slot" marker (e.g., a logic "1") in the controller memory (step 812). Otherwise, a "good slot" condition may be indicated (e.g., by storing a "0" into memory) (step 814).

An incremental charging cycle may subsequently be applied to the "good slots" (steps 816, 818, and 820) for a predetermined time interval that may be based on the specified battery charge rate (e.g., approximately 166.7 milliamps for three hours) divided over the number of charging slot positions. For example, twelve slot positions would apply approximately 166.7 milliamps at 15 minutes per incremental slot charging cycle. As discussed before, the sensing operation 808 may be repeated after each incremental slot charging cycle to positively identify a "bad slot".

The plurality of batteries ready to be presented from aperture 400 at the bottom plate 204 may be subsequently dispensed into the date coding machine 130 or diverted to a reject bin (step 826), based on the stored marker at the controller module. The "good slot" batteries may be subsequently coded with a representation of a calendar date and delivered into a storage bin (step 828). The battery charging cycle is repetitive and consequently the battery charging machine 100 continues to receive batteries (step 800), etc. In this way, the battery charging machine 100 is capable of performing the battery charging and optional date coding functions in a relatively automatic fashion.

Figure 9:
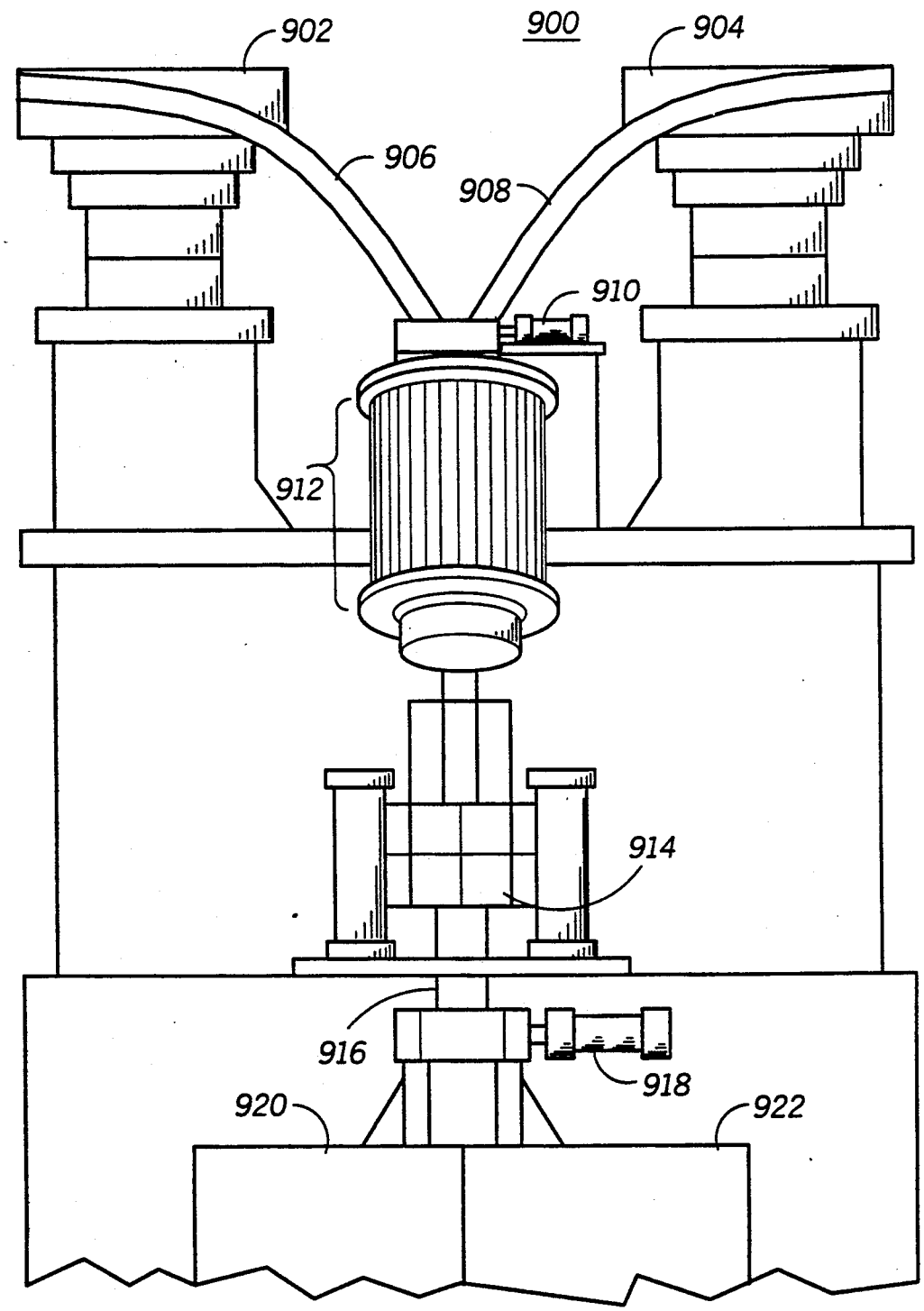
FIG. 9 is a side view of a battery charging apparatus, in accordance with an alternate embodiment of the present invention.

Referring to FIG. 9, a side view of a battery charging machine 900 is shown, in accordance with an alternate embodiment of the present invention. This configuration allows more than one vibratory feeder (902 and 904) to supply batteries for the battery charging operation. In this fashion, the charging process may be substantially continuous, having minimal delays due to an empty hopper (902 and 904) condition or repeatedly misoriented batteries falling back into the vibratory feeder (902 and 904). Once the batteries arrive at a respective hopper output queue (not shown) via the respective channels 906 and 908, the controller module (not shown) may control the source of batteries that drop into a charging slot by positioning a chute (not shown) to receive from either output queue. Each output queue may selectively disburse the queued batteries via a respective output control valve (not shown) controlled by the controller module. Each control valve may be activated using an air cylinder (e.g., 910). The charging module 912 and coding machine 914 operate substantially similar to the previously discussed charging module 112 and coding machine 130. One final advantage may be the controllable output chute 916 and air cylinder 918 arrangement, allowing selective disbursement of the plurality of charged and coded batteries into a first 920 and a second 922 storage bins.

Moreover, different battery sizes (e.g., AA and AAA) or types (e.g., double N) may be queued from different hoppers (902 and 904). Consequently, the controller module may direct the different queues to fill selected slots, and control the individual charging voltages and/or currents and charging times for the batteries within the respective slots to effect proper charging.

Additionally, the date stamping process may be capable of applying a representation of a calendar date to the different batteries. In this way, batteries of different sizes and/or types may be automatically and rapidly charged and stamped in a manner supportive of a mass manufacturing environment.

We claim:

1. An apparatus for charging a plurality of batteries, comprising:
   means for receiving and automatically orienting the plurality of batteries to produce a plurality of oriented batteries;
   a housing having a first aperture for receiving the plurality of oriented batteries therethrough and a second aperture for facilitating the removal of at least one battery therefrom, the housing including at least two slots capable of being rotatively indexed between positions at the first and second apertures for accommodating the plurality of oriented batteries therein during a charging process;
   means for charging the plurality of oriented batteries accommodated within the at least two slots; and
   means for rotatively indexing the at least two slots so as to position a slot accommodating at least one battery at the second aperture to facilitate the removal of the at least one battery.

2. The apparatus of claim 1, wherein the automatic orienting means further comprises battery delivery means for delivering the plurality of oriented batteries at the first aperture.

3. The apparatus of claim 1, further comprising coding means for applying a representation of a calendar date to the at least one battery.

4. The apparatus of claim 3, wherein the coding means further comprises battery delivery means for delivering the at least one coded battery.

5. The apparatus of claim 1, further comprising control means for monitoring battery receiving and removing, slot positioning, and the battery charging process.

6. The apparatus of claim 1, further comprising battery polarity sensing means for indicating when the slot accommodated at least one battery is misoriented.

7. The apparatus of claim 1, wherein the means for rotatively indexing the at least two slots comprises a stepper motor.

8. The apparatus of claim 1, wherein the means for rotatively indexing the at least two slots comprises a ratchet and lever mechanism.

9. The apparatus of claim 1, wherein the means for rotatively indexing the at least two slots comprises a cam and lever mechanism.

10. The apparatus of claim 1, wherein the means for charging the plurality of oriented batteries comprises a constant current source to provide a substantially constant current while charging the plurality of oriented batteries.

11. A method for charging a plurality of batteries in an apparatus comprising a housing having a first aperture for receiving a plurality of batteries therethrough and a second aperture for facilitating the removal of at least one charged battery therefrom, the housing including at least two slots capable of being rotatively indexed between the first and second apertures for accommodating the plurality of batteries therein during a charging process, the method comprising the steps of:
   (a) receiving at least one battery into a slot at the first aperture;

(b) rotatively indexing the at least two slots so as to position the slot substantially aligned with the second aperture;

(c) charging the at least one battery within the slot; and (d) delivering the at least one charged battery at the second aperture.

12. The method of claim 11, wherein steps (b) and (c) are reversed.

13. The method of claim 11, further comprising the step, subsequent to step (a), of sensing the polarity of the at least one battery within the slot.

14. The method of claim 13, further comprising the step of indicating when any of the at least one battery is misoriented within the slot.

15. The method of claim 11, further comprising the steps, prior to step (a), of:
   automatically orienting a plurality of batteries; and
   delivering the plurality of oriented batteries at the first aperture.

16. The method of claim 11, further comprising the step, subsequent to step (d), of:
   (e) applying a representation of a calendar date to the at least one charged battery.

17. An apparatus for charging a plurality of batteries, comprising:
   a housing having a first aperture for receiving a plurality of batteries therethrough and a second aperture for facilitating the removal of at least one battery therefrom, the housing including at least two slots capable of being rotatively indexed between positions at the first and second apertures for accommodating the plurality of batteries therein during a charging process;
   means for receiving and automatically orienting the plurality of batteries to produce a plurality of oriented batteries, as well as for delivering at least a portion of the plurality of oriented batteries at the first aperture and into a slot;
   battery polarity sensing means for indicating when any of the plurality of oriented batteries is misoriented within the slot;
   means for charging the plurality of oriented batteries within the at least two slots using a constant current source;
   a ratchet and lever mechanism constructed and arranged for rotatively indexing the at least two slots so as to position one of the slots accommodating at least one charged battery at the second aperture, thereby facilitating the removal of the at least one charged battery;
   control means for monitoring battery receiving and removing, slot positioning, and the battery charging process; and
   coding means for applying a representation of a calendar date to the at least one charged battery.

* * * * *